United States Patent
Damm et al.

[19]

[11] Patent Number: 6,118,076

[45] Date of Patent: *Sep. 12, 2000

[54] CABLE SEAL INSERT

[75] Inventors: Jesper Damm, Herlev, Denmark; Hendrik Graulus, Veltem Beisem, Belgium; Jacques Brusselmans, Orp-Jauche, Belgium; Jean-marie Etienne Nolf, Korbeek-Lo, Belgium; Michel van Hissenhoven, Wilrijk, Belgium

[73] Assignee: N.V. Raychem S.A., Kessel-Lo, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/981,942

[22] PCT Filed: Jun. 18, 1996

[86] PCT No.: PCT/GB96/01450

§ 371 Date: Mar. 2, 1998

§ 102(e) Date: Mar. 2, 1998

[87] PCT Pub. No.: WO97/02637

PCT Pub. Date: Jan. 23, 1997

[30] Foreign Application Priority Data

Jun. 30, 1995 [GB] United Kingdom .................... 9513365
Nov. 22, 1995 [GB] United Kingdom .................... 9523915
Feb. 20, 1996 [GB] United Kingdom .................... 9603549

[51] Int. Cl.[7] ................................................. H02G 15/02
[52] U.S. Cl. ........................................... 174/77 R; 174/92
[58] Field of Search .................... 174/74 R, 93, 174/92, 77 R, 88 S

[56] References Cited

U.S. PATENT DOCUMENTS

| 4,287,386 | 9/1981 | Scahill et al. ............................... 174/76 |
| 4,332,975 | 6/1982 | Dienes ........................................ 174/76 |
| 4,387,268 | 6/1983 | Morel et al. ............................... 174/92 |
| 4,492,816 | 1/1985 | Morel et al. ............................... 174/92 |
| 5,302,779 | 4/1994 | Morel et al. ............................... 174/92 |
| 5,675,124 | 10/1997 | Stough et al. ......................... 174/65 G |

FOREIGN PATENT DOCUMENTS

| 0 511 147 A1 | 4/1992 | European Pat. Off. .......... G02B 6/44 |
| 2 377 887 | 1/1978 | France ............................ B32B 32/08 |
| 3624900 A1 | 7/1986 | Germany ..................... H02G 15/013 |
| 3715945 A1 | 5/1987 | Germany ..................... H02G 15/013 |
| 2 261 960 | 6/1993 | United Kingdom ............. G02B 6/44 |
| WO 93/26069 | 12/1993 | WIPO ............................ H02G 15/00 |
| WO 95/15600 | 6/1995 | WIPO ......................... H02G 15/013 |
| WO 95/27321 | 10/1995 | WIPO ............................ H01R 13/52 |
| WO 97/02637 | 1/1997 | WIPO ......................... H02G 15/013 |

Primary Examiner—Kristine Kincaid
Assistant Examiner—William H Mayo, III
Attorney, Agent, or Firm—Allen, Dyer, Doppelt, Milbrath & Gilchrist, P.A.

[57] ABSTRACT

A cable seal insert for sealing a cable entry in a closure, including:

(a) at least two plates, each of which, at least in use, has extending therethrough at least one aperture for a cable; and (b) sealing material located between the plates;

wherein a peripheral surface of the seal insert which is substantially parallel to the or each cable aperture is substantially planar, and at least one of the plates is formed from non-elastomeric material.

24 Claims, 9 Drawing Sheets

CABLE SEAL INSERT

FIELD OF THE INVENTION

The present invention relates to improvements in the sealing of sealed cable closures having openings for the entry of cables (which term includes electrically conductive cables, optical fiber cables, wires or other conductors, optical fibers or the like).

BACKGROUND OF THE INVENTION

It is known to provide closures comprising two substantially rigid casing members, e.g. a base and a cover, which are fitted together when the closure is formed and in which the joint between the two parts is sealed by a sealing strip in the form of an O-ring. Such closures are used for example to protect splices in telecommunications cables which may contain metallic conductors or optical fibers. Such closures must be provided with means for allowing entry of one or more cables into the closure, and for sealing the closure at the point at which the cable enters.

One way in which this has been done, as disclosed in UK patent application GB-A-2261960, is to provide an opening in the wall of the base of the closure, in the form of a recess which intersects a surface of the base which abuts against a surface of the cover of the closure. A rubber insert is provided with one or more central apertures into which a cable can be inserted. The rubber insert is then introduced into the recess, where it contacts the walls of the recess and corresponding parts of the cover and an O-ring gasket which seals between the base and the cover. The insert has a flat peripheral surface at the point at which it comes into contact with the gasket. A slot may be provided in the insert to allow it to be opened to insert a cable laterally into the central aperture. A similar system is also disclosed in European patent application EP-A-0511147.

The arrangements disclosed in GB-A-2261960 and EP-A-0511147 suffer from the problem that their seal inserts (termed "sealing gaskets" in GB-A-2261960), being formed from rubber or like elastic material, do not normally provide an adequate seal unless they are coated by hand, prior to closing the casing, with a grease or the like. This is time consuming for the installation engineer and also requires him consistently to provide an adequate coating of grease for each insert each time he installs a cable splice closure, and it is consequently unreliable. Furthermore, even with an adequate grease coating, the inserts may not provide an effective long-term seal. The rubber inserts also suffer from the disadvantage that they are unable to accommodate cables over a significant range of sizes or shapes.

SUMMARY OF THE INVENTION

There is a need to provide a cable seal insert which does not, for example, require the manual application of grease before use, which is able to accommodate a significant range of cable sizes, and which provides a better seal than the prior art inserts. A purpose of the invention is to provide a cable seal insert, and a cable splice closure including such an insert, which is easy to install, and which provides an excellent seal around a cable in a cable entry aperture in the casing of the closure.

According to a first aspect of the present invention, a cable seal insert is provided for sealing a cable entry in a closure, the insert comprising:
(a) at least two plates, each of which, at least in use, has extending therethrough at least one aperture for a cable; and
(b) sealing material located between the plates;
wherein a peripheral surface of the seal insert which is substantially parallel to the or each cable aperture is substantially planar, and at least one of the plates is formed from non-elastomeric material.

According to a second aspect of the invention, a cable seal insert is provided for sealing a cable entry in a closure, the insert comprising:
(a) at least two plates, each of which, at least in use, has extending therethrough at least one aperture for a cable; and
(b) sealing material located between the plates;
wherein a peripheral surface of the seal insert which is substantially parallel to the or each cable aperture is substantially planar, and, in at least one of the plates, there is an opening at each laterally extreme edge of the substantially planar peripheral surface thereof, into which opening, at least in use, some of the sealing material extends.

According to a third aspect of the invention, a cable seal insert is provided for sealing a cable entry in a closure, the insert comprising:
(a) at least two plates, each of which, at least in use, has extending therethrough at least one aperture for a cable; and
(b) sealing material located between the plates;
wherein a surface of at least one of the plates, which surface is in contact with the sealing material, has at least one recess therein into which some of the sealing material may expand and/or be displaced in use.

Preferably, a peripheral surface of the seal insert according to the third aspect of the invention which is substantially parallel to the or each cable aperture is substantially planar.

According to a fourth aspect of the invention, a cable seal insert is provided for sealing a cable entry aperture in an end portion of a cable splice closure casing, the cable seal insert having a substantially planar first peripheral surface to seal against a gasket sealing member of the casing, and a second peripheral surface, at least partly comprising sealing material, extending from one end of the first peripheral surface around the periphery of the seal insert to the other end of the first peripheral surface, to seal against the end portion of the casing, the seal insert having an opening where the first and second peripheral surfaces meet, through which the sealing material of the second peripheral surface extends to the first peripheral surface. Preferably, at least in use, there is an opening where the first and second peripheral surfaces of the cable seal insert meet, at each end of the first peripheral surface which is situated, in use, at each side of the cable entry aperture, i.e. at each edge between the first and second peripheral surfaces. The cable seal insert according to the fourth aspect of the invention preferably comprises two (or more) plates between which is the sealing material.

For convenience, the word "flat" will often be used in this specification in place of the words "substantially planar", when refering to the substantially planar peripheral surface of the cable seal insert.

According to a fifth aspect of the invention, a cable splice closure is provided, the closure comprising a substantially rigid casing comprising a base and a cover sealed together, in use, by a gasket sealing member, the base and/or the cover having one or more cable entry recesses, and wherein the or each recess is sealed, in use, by a cable seal insert received therein and abutting against the gasket sealing between the base and the cover, wherein the cable seal insert is a cable seal insert according to the first, second, third or fourth aspects of the invention.

According to a sixth aspect of the invention, a cable splice closure is provided, the closure comprising a casing which comprises a casing end portion and a cover, the casing end portion having a cable entry aperture which is open in cross-section, the cross-section being closed by the cover, a gasket sealing member which seals, in use, between the casing end portion and the cover, and a cable seal insert which is received, in use, in the cable entry aperture, and which has a first peripheral surface across which, in use, extends the gasket sealing member, and a second peripheral surface which, in use, seals against the casing end portion in the cable entry aperture, wherein the second peripheral surface of the cable seal insert at least partly comprises sealing material, and at least in use there is an opening in the cable seal insert where the first and second peripheral surfaces meet, through which the sealing material of the second peripheral surface extends to the first peripheral surface. The sealing material of the cable seal insert preferably thereby forms a seal, in use, between the cable seal insert, the gasket sealing member and the casing end portion where they all meet each other.

In particularly preferred cable splice closures according to the invention, the casing end portion comprises part, preferably an integral part, of a base of the casing. The casing may thus be of the type comprising a base and a cover which may be brought together to close the casing, the or each cable entry aperture being provided in the base and being open in cross-section, the cross-section being closed by the cover. The gasket sealing member preferably comprises an O-ring seal which seals between the base and the cover.

Preferably, in use, one or more cables (which term, as mentioned above, includes wires, optical fibers etc.) is/are introduced into the cable aperture(s) of the cable seal inserts. The or each cable seal insert is then preferably introduced into a recess in one part (the base or the cover) of the casing forming the closure. An O-ring or other gasket sealing member is preferably then brought into contact with the flat peripheral surface(s) or the cable seal insert(s), and the other part of the casing is attached to the first part such that the gasket seals between the two parts. The or each recess into which the insert(s) is/are received, is preferably of such a size that the opposed plates of the insert are moved towards one another to put the sealing material under pressure, thereby displacing it sideways so as to form a seal to the cable, to the recess in which the insert is located, and to the gasket.

According to the first aspect of the invention, and preferably according to the other aspects of the invention, each plate of the cable seal insert is formed from a non-elastomeric material. At least one of the plates, preferably each plate, is preferably substantially rigid. By this is preferably meant that the or each plate is substantially undeformed, in use, by the sealing material. At least one of the plates, preferably each plate, preferably has a Shore A hardness of greater than 90.

If an elastomeric gasket or other sealing member is used in the closure, for example, it may be necessary to stretch it slightly to fit it into place. This will normally generate forces tending to pull the gasket inwards, away from the centre of the flat peripheral surface of the insert, i.e. away from the sealing material between the plates and onto one of the plates. However, according to the second aspect of the invention, and preferred embodiments of the other aspects of the invention, in at least one of the plates there is an opening at each laterally (with respect to the direction in which the cable(s) extend through the insert) extreme edge of the substantially planar peripheral surface of the plate, into which opening, at least in use, some of the sealing material extends. This has the advantage that a gasket or other sealing member extending, in use, across such a plate of the cable seal insert will be in sealing contact with the sealing material at each laterally extreme edge of the cable seal insert. This is advantageous because the seal provided, in use, by the cable seal insert is generally most likely to fail (if at all) at these laterally extreme edges (sometimes termed "triple points" in the art). By providing the openings, thus allowing the sealing material to extend to the laterally extreme edges of the plate, the risk of such a failure of the seal is greatly reduced.

The openings (where present) at each laterally extreme edge of the cable seal insert preferably comprise "cut-away" portions of the plate(s). (The "cut-away" portions are not necessarily actually cut from the plates—they may be moulded as part of the plates for example—but they preferably have the appearance of cut-away portions.) The cut-away portions may have any of a number of shapes. They may, for example, be generally triangular or generally rectangular, e.g. square. The cut-away portions or other openings may be provided in just one of the plates or in each of the plates. An advantage of having them in each of the plates is that it will generally not matter which way round the inserts are inserted into the recesses.

According to at least the fourth and sixth aspects of the invention, the second peripheral surface of the cable seal insert at least partly comprises sealing material which extends through an opening between the first and second peripheral surfaces of the cable seal insert where the first and second peripheral surfaces meet, thereby providing sealing material at each edge between the first and second peripheral surfaces, such that in use the sealing material preferably forms a seal between the cable seal insert, the gasket sealing member and the casing end portion where they all meet each other. This is advantageous, as indicated above, because the meeting point of these three elements, (the "triple point"), is generally the most difficult point to seal.

According to the fourth and sixth aspects of the invention, the sealing material which is provided where the first and second peripheral surfaces of the cable seal insert meet may be provided in openings in each laterally extreme edge of the flat (first) peripheral surface of a plate of the cable seal insert (i.e. as is the case with the third aspect of the invention). Alternatively, for example, such sealing material may be provided between plates of the cable seal insert. However, unlike the situation where the gasket sealing member extends across one of the plates of the cable seal insert, and is thus supported by the plate where it extends across the width of the cable seal insert, when the gasket sealing member lies on top of the sealing material between the plates, no such support is provided. In this case, therefore, at least one support is preferably provided on the first peripheral surface of the cable seal insert between the openings, to support the gasket sealing member and thereby substantially to ensure that it forms a seal against the cover where it extends across the cable seal insert. This has the advantage that, while the gasket sealing member can contact the sealing material at the ends of the first peripheral surface, i.e. at the triple points, and can consequently form an enhanced seal at those points, the sealing member is supported between the triple points and consequently may be sufficiently compressed between the cable seal insert and the cover in order to form an adequate seal across the cable seal insert. If, instead, the gasket sealing member was in contact with the sealing material across the whole width of the cable seal insert, because the sealing material is ordinarily a soft or compressible material, sufficient compression of the gasket sealing member might not be achieved, and consequently an adequate seal might not be formed, particularly between the gasket sealing member and the cover. This can be the case even for narrow cable seal inserts which are only required to accommodate one cable, for example, and the potential problem normally becomes even worse for wider cable seal inserts which are required to accommodate two or more cables, for example.

Preferably, where present, the or each support is part of the cable seal insert. For example, the support(s) may comprise part of the first peripheral surface of the cable seal insert. Additionally, or alternatively, as described in more detail below, the or each support may be separate or separable from the cable seal insert.

For cable seal inserts which comprise two (or more) plates between which is sealing material, the or each support (where present) preferably extends between the two plates. The support(s) may, for example, be substantially flat, or they may be elongate, e.g. in the form of pins or the like. Advantageously, the or each support may comprise a part of one plate which overlaps the other (or another) plate. It is preferred that the or each support permits the plates to be moved towards or away from each other. A particularly preferred arrangement is one in which the or each support comprises a part, preferably a substantially flat part, of one plate which protrudes into a recess, preferably a slot, in the other plate.

In embodiments in which the or each support is separate or separable from the cable seal insert, the or each support preferably comprises a part of the casing which, in use, lies between the first peripheral surface of the cable seal insert and the sealing member. Advantageously, the or each support may slot, in use, into the casing end portion. The support may even be part of a separate casing part which, together with the casing end portion, defines the cable entry aperture, and which may advantageously slot into the casing end portion.

While other solutions have been proposed for sealing other "triple point" geometries (see for example U.S. Pat. No. 4,845,314, WO 95/15600 (Raychem), WO 95/15601 (Raychem) and WO 95/15602 (Raychem)), no other solution has yet been proposed for the sealing of triple points associated with casings and cable seal inserts of the type to which the present invention is directed. Simply coating a rubber insert with grease by hand has not provided a sufficiently reliable and consistent way of sealing such triple points.

Preferably the sealing material is softer material than the material of the rest of the cable seal insert. The sealing material may, for example, comprise gel (described in more detail below), polymeric foam, elastomeric material and/or mastic or the like. The rest of the cable seal insert preferably supports and/or retains the sealing material; as already mentioned, the plate(s) may for example be formed from a plastics material, e.g. polypropylene.

The cable seal insert, in addition to its substantially planar peripheral surface, is preferably bounded by a single curved peripheral surface substantially parallel to the or each cable aperture. However, depending on the shape of the recess(es) in the casing, other shapes may be used.

Advantageously, a slit or other opening may extend from a peripheral surface of the cable seal insert to the or each cable aperture, to allow the cable seal insert to be opened for lateral insertion of a cable. One or more hinges or the like may be provided to facilitate opening of the cable seal insert. Additionally or alternatively, the cable seal insert may be formed from two or more separable parts.

According to the third aspect of the invention, and also according to preferred embodiments of the other aspects of the invention, a surface of at least one of the plates, which surface is in contact with the sealing material, has at least one recess in it, into which some of the sealing material may expand and/or be displaced in use. This has the advantage that expansion of the sealing material, e.g. due to a rise in temperature, or displacement of the sealing material, e.g. due to a large diameter cable being inserted into the cable seal insert, may be accommodated substantially without loss (or at least without significant loss) of sealing material from between the plates. One reason for this generally being advantageous is because, if subsequently the temperature drops or the large diameter cable is removed (for example) the sealing material which has expanded or been displaced into the or each recess will normally automatically return generally to its original (i.e. pre-expansion or pre-displacement) location. In contrast, if the or each recess were not present, the sealing material would escape elsewhere, and would not necessarily automatically return to its original location, thus resulting in a reduction, or even a complete loss, of sealing. Also, if the sealing material were to escape elsewhere (i.e. other than into the recess(es)), it might contaminate other parts of the closure, e.g. it might interfere with the correct closing action of the closure, for example by contaminating closure bolts or other closure members. Advantageously, the or each recess may be open to the exterior of the cable seal insert, i.e. it may extend the whole way through the thickness of the plate, or it may contain one or more holes which extend through the plate to the exterior. This has the advantage of releasing substantially any build up of air (or other gas or vapour) pressure in the or each recess which might arise due to displacement or expansion of some of the sealant into the recess. Alternatively, the or each recess may be closed to the exterior of the cable seal insert; this will normally have the (opposite) advantage that air (or one or more other gases or vapours) contained within the or each recess may act as a means of applying compression to the sealing material, since a reduction in the volume available in the recess for the air, due to some of the sealing material expanding or being displaced into the recess, will cause the air to become pressurized and consequently to exert its pressure on the sealing material. This is normally advantageous because putting the sealing material under compression often improves the sealing performance of the sealing material; this is particularly the case with gel sealing material, for example.

The escape of sealing material may additionally or alternatively be substantially prevented by the use of one or more barriers for the sealing material. Advantageously, the cable seal insert (according to any aspect of the invention) may include one or more, preferably at least two, barriers for substantially preventing the sealing material from escaping from between the plates in use. The barriers preferably substantially prevent displacement of the sealing material, in use, from part of the periphery of the cable seal insert, i.e. from the sides and/or from the substantially planar (flat) surface of the cable seal insert. The or each barrier preferably comprises an extension of at least one of the plates of the cable seal insert, which extension preferably extends towards the other plate. Such barriers are preferably situated at the corners between the substantially planar (flat) surface and the lateral peripheral surface(s) of the cable seal insert, since it is at these cornes that escape of the sealing material is normally most likely.

Each plate of the cable seal insert may advantageously include a plurality of flaps extending into the or each cable aperture from the internal periphery of the aperture. The flaps, which can preferably flex with respect to the plate, are preferably provided around substantially the entire internal periphery of the or each cable aperture, and preferably extend towards the opposite plate as well as towards the centre of the cable aperture (although extension away from the opposite plate is possible as an alternative). Such flaps may have at least one of the following advantages: firstly they may help to retain the sealing material between the plates; secondly they may enable the cable aperture(s) to accommodate a significant range of sizes and cross-sectional shapes (e.g. oval cross-sections) of cable; and thirdly they may help to put the sealing material under compression by being resilient. The flaps may be referred to as "crowns" since they may give the cable apertures a crown-like appearance.

It is preferred that the sealing material have a Stevens-Volland hardness (i.e. a hardness as measured by a Stevens-Volland texture analyser) of no more than 150 g, more preferably no more than 130 g, especially no more than 120 g, and at least 45 g, more preferably at least 50 g, especially at least 60 g. A particularly preferred hardness range is 45 g to 60 g. Stevens Voland hardness is measured on a Stevens LFRA Texture Analyser having a stainless steel circular spindle of diameter about 0.64 cm, the measurement being taken at a penetration of 4 mm. Additionally or alternatively, the sealing material preferably has a cone penetration as measured by ASTM D217 of at least 50 ($10^{-1}$ mm), more preferably at least 100 ($10^{-1}$ mm), even more preferably at least 200 ($10^{-1}$ mm), and preferably no greater than 400 ($10^{-1}$ mm), especially no greater than 350 ($10^{-1}$ mm). The sealing material preferably has a certain elasticity, and in particular preferably has an elongation to break of at least 100%, preferably at least 200%, more preferably at least 300%.

As mentioned above, a particularly preferred sealing material comprises gel. The gel may, for example, comprise silicone gel, urea gel, urethane gel, thermoplastic gel, or any suitable gel or gelloid sealing material. Preferred gels comprise liquid (e.g. oil)-extended polymer compositions. The polymer composition of the gel may for example comprise an elastomer, or a block copolymer having relatively hard blocks and relatively elastomeric blocks. Examples of such copolymers include styrenediene block copolymers, for example styrene-butadiene or styrene-isoprene diblock or triblock copolymers e.g. as disclosed in international patent application WO/88/00603. Preferably, however, the polymer composition comprises one or more styrene-ethylene-propylene-styrene block copolymers, for example as sold under the Trade Mark SEPTON by Kuraray of Japan. SEPTON is a thermoplastic elastomer sealing gel. The extender liquids employed in the gel preferably comprise oils. The oils may be hydrocarbon oils, for example paraffinic or napthenic oils, synthetic oils for example polybutene or polypropene oils, or mixtures thereof. The preferred oils are mixtures of non-aromatic paraffins and naphthenic hydrocarbon oils. The gel may contain additives, e.g. such as moisture scavengers (e.g. Benzoyl chloride), antioxidants, pigments and fungicides.

BRIEF DESCRIPTION OF THE DRAWINGS

The invention will now be illustrated, by way of example, with reference to the accompanying drawings, of which.

DETAILED DESCRIPTION OF THE PREFERRED EMBODIMENTS

Figure 1:
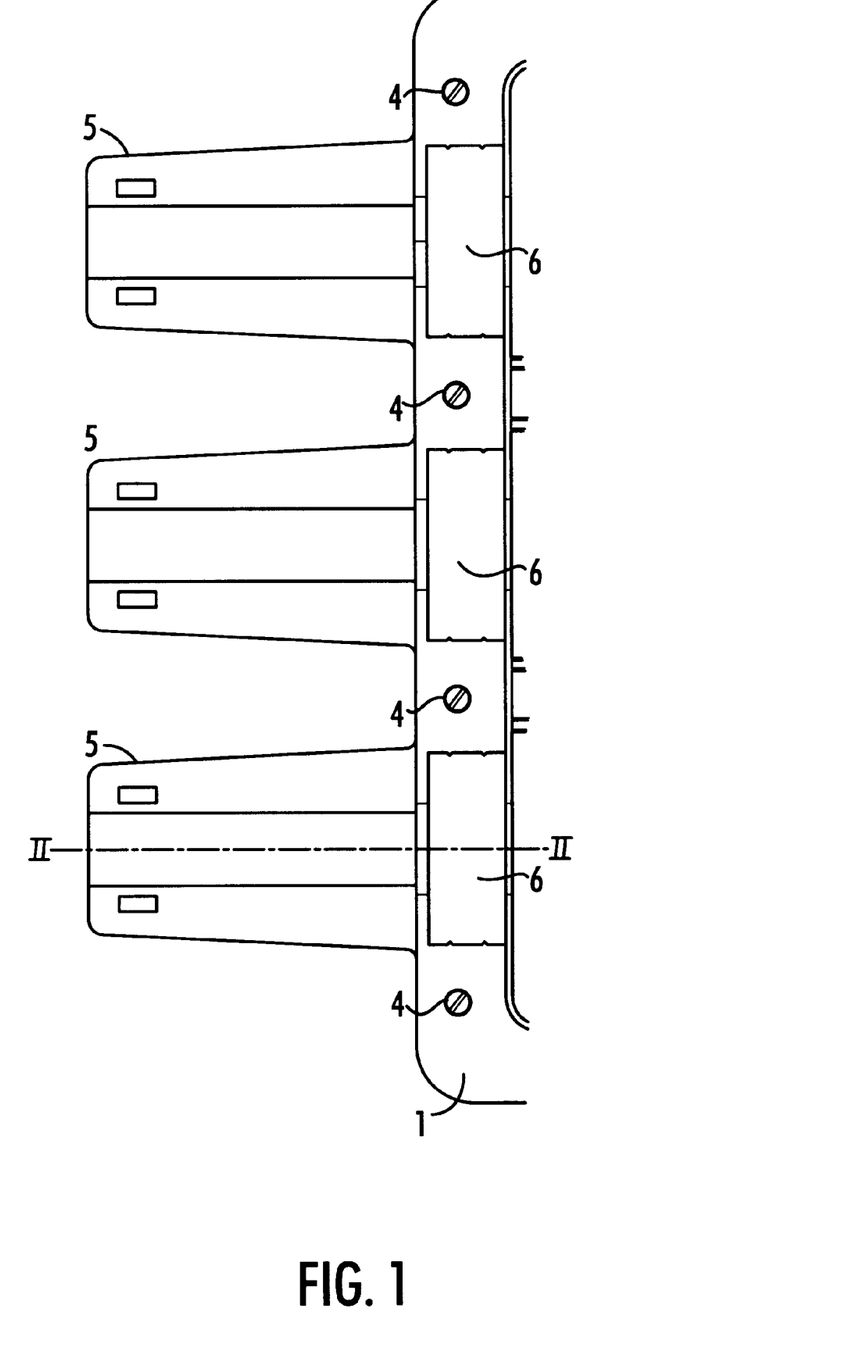
FIG. 1 is a plan view of a cable entry portion of the base of a cable splice closure of the prior art.
Figure 2:
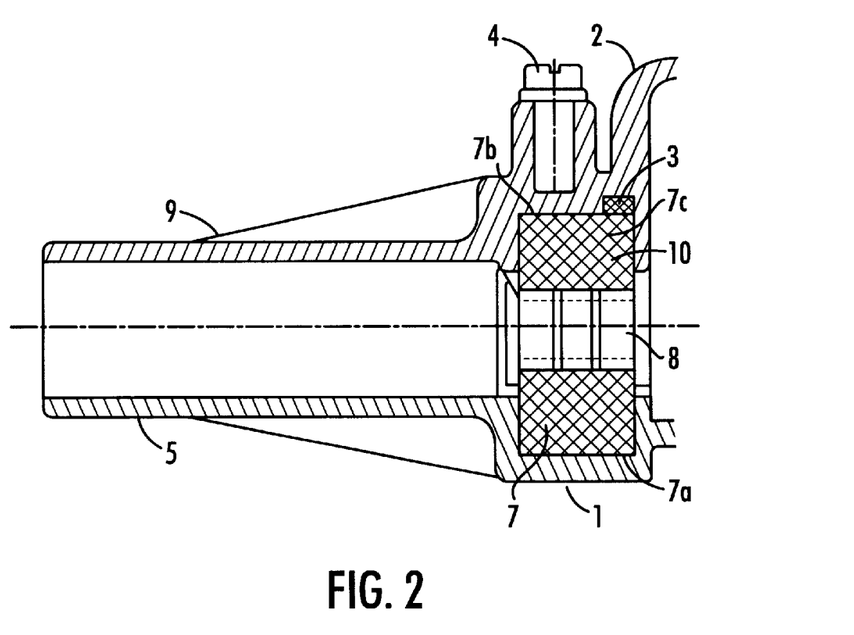
FIG. 2 is a cross-section of the base and cover portions of the closure along a line corresponding to II—II of FIG. 1.

FIG. 1 shows part of a cable splice closure (e.g. for optical fiber splices), comprising a base 1 and a cover 2, between which there is defined a central cavity which may, for example, contain conventional arrangements for making or organizing splices between optical fibers. These do not themselves form part of the invention and are not shown in the interests of clarity. Recesses in the lid receive a rubber or other gasket 3 which provides a seal between the base and cover when the base and cover are fastened together, e.g. by screws 4. The base is provided with projecting cable guides 5. These are open at the top and define a passage extending into the interior of the base to allow entry of optical fiber cables into the base. The passage is so shaped that the cables can be lowered into the passages from above. A recess 6 is provided in the base in the path of each cable passage. This recess may have a generally U-shaped base, and is shaped so as to receive a known cable seal insert 7 as shown in FIG. 2. The cable seal insert 7 is positioned so that its U-shaped lower part 7a fits in the U-shaped base of the recess and so that its flat upper peripheral surface 7b contacts gasket 3. In FIG. 2 there is no cable in place in the seal insert and the central aperture is blocked by a removable plug 8.

The cover 2 is shaped so as to provide cable guide means 9 which co-operate with the cable guide means of the base to form a closed passage. The cover also has recesses shaped so as to receive the projecting parts 10 of the cable inserts of FIG. 2 when they are in place in the base. The gasket 3 may be so positioned that it is in contact with the inner side 7c of the flat peripheral surface of the cable seal insert when the cover is fixed to the base.

Figure 3:
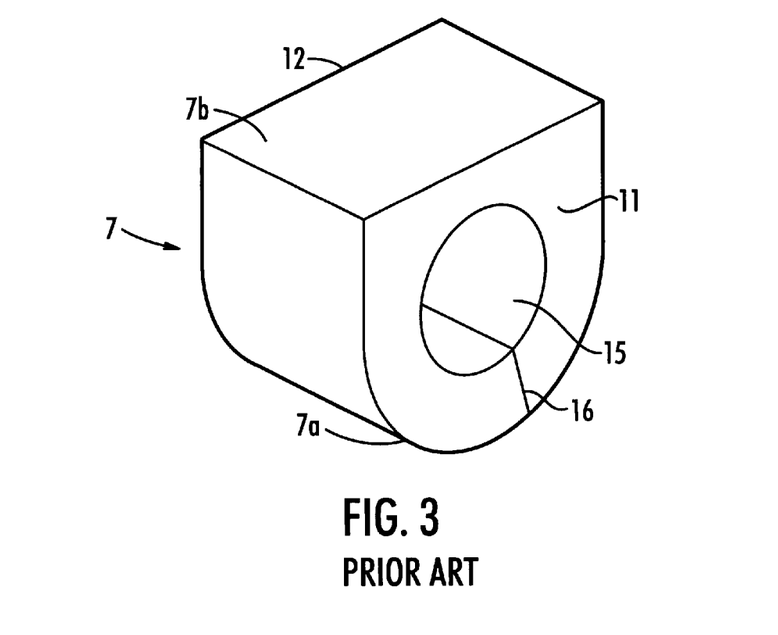
FIG. 3 is a perspective view of a known (prior art) cable seal insert for use with such a splice closure.

The prior art cable seal insert 7 of FIG. 3 is a one piece rubber moulding having opposed flat surfaces 11, 12 a curved peripheral surface 7a and an upper flat peripheral surface 7b. A central aperture 15 is provided for receiving a cable. A slit 16 in the insert may extend from the curved peripheral surface 11 to the central aperture 15 to allow the insert to be opened along the line of the split for the lateral insertion of a cable into the aperture.

Figure 4:
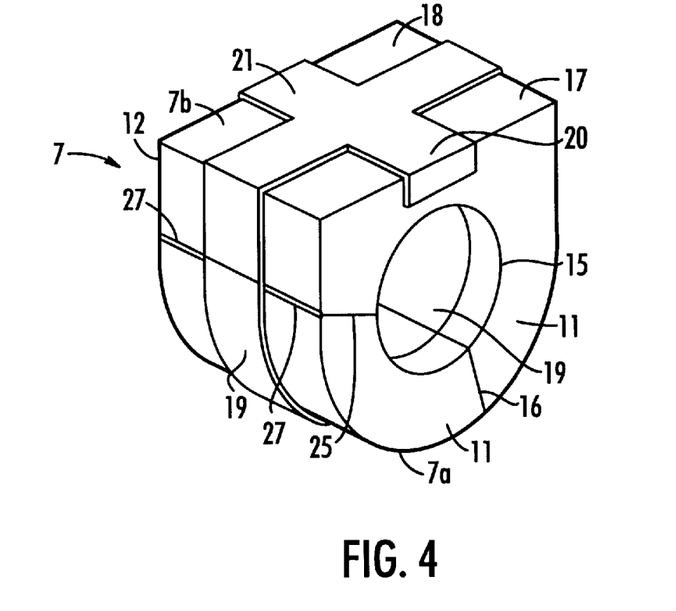
FIG. 4 is a perspective view of a cable seal insert according to the invention.

A cable seal insert 7 according to the invention is shown in FIG. 4. The two opposed plates 11, 12 are formed from non-elastomeric material 17, 18. A layer of gel sealing material 19 lies between the plates 11, 12. An aperture 15 of substantially uniform cross-section extends through each plate 11, 12 and through the layer of gel 19. Portions of the plates may be cut away at the top flat peripheral surfaces and the cutaway portions filled with gel 20, 21. A slit 16 connects the central aperture 15 to the outside curved peripheral surface 11. Each plate has a hinge 27 (e.g. a so-called "living hinge", i.e. integral with the plate) and another slit 25, to enable the slit 16 to be opened out. When the insert is placed in the recess provided in the base the opposed end plates are pressed together thereby putting the gel under pressure, so helping to seal the cable entry aperture 15. When the cover is placed over the base the rubber gasket sealing member which seals the joint between the base and cover will be over the gel either along the centre of the insert or in the cut-away portion of the plate, so helping to give a good seal.

The gel sealing material can be seen to extend to the external peripheral surfaces of the insert around its entire periphery (although some of the periphery is hidden from view). As a result, the gel can form a continuous uninterrupted seal around the whole of the insert. Also, the gel can be seen to extend inwardly to the aperture 15, and as a result form a seal completely around a cable within the insert. This allows a gel seal to be formed between the cable and the closure into which the insert is positioned.

Figure 5:
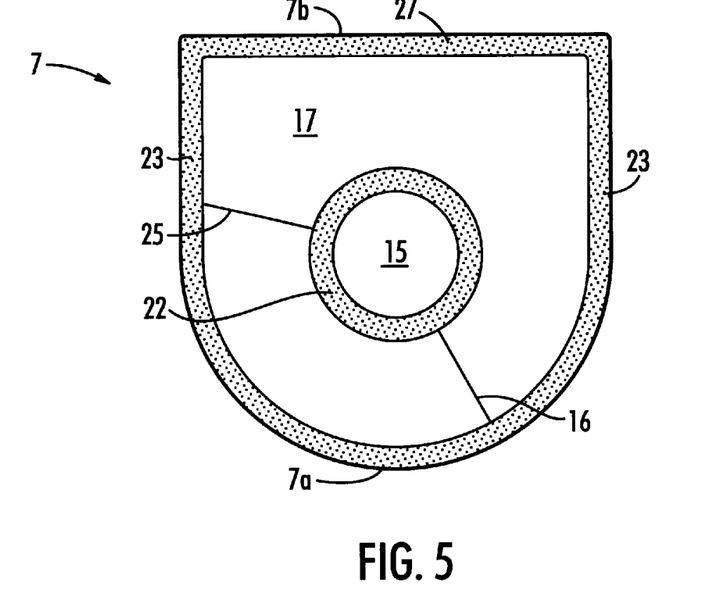
FIG. 5 shows the effect of axial compression of the insert of the invention in producing a desired displacement of gel or other sealing material.

As the cable seal insert 7 is pushed into a recess in the outlet of the closure, it may be axially compressed (as shown in FIG. 5) due to the two plates being forced together, depending on the relative dimensions of the recess and the insert. This deforms the gel sealing material radially inwards and outwards, producing beads 22, 23 respectively, forcing it against the cable and the outlet of the closure. For clarity, FIG. 5 shows the axially compressed seal insert without cable or closure. Because of the ability of the gel sealing material to be deformed or displaced in this way, the seal insert of the invention is able to accommodate and seal cables over a wide range of sizes and cross-sectional shape.

Figure 6A:
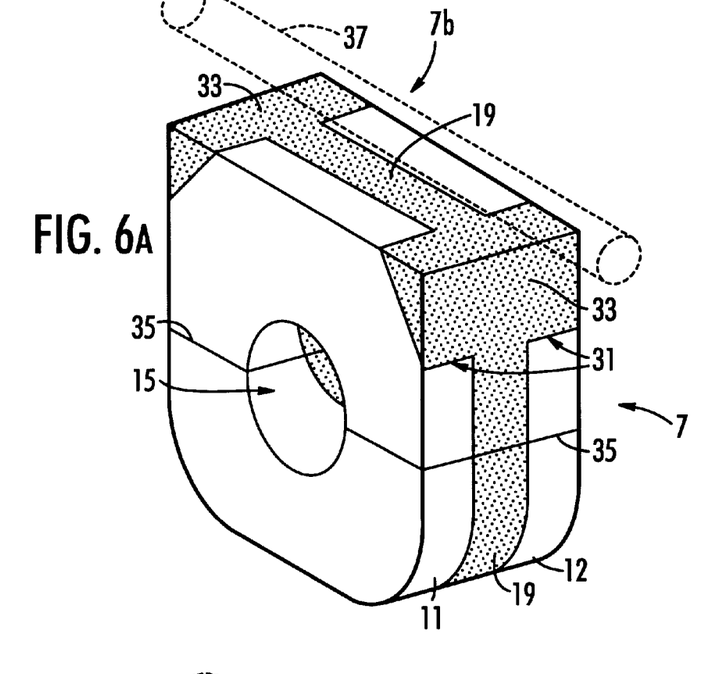
FIGS. 6A and 6B show two further cable seal inserts according to the invention.
Figure 6B:
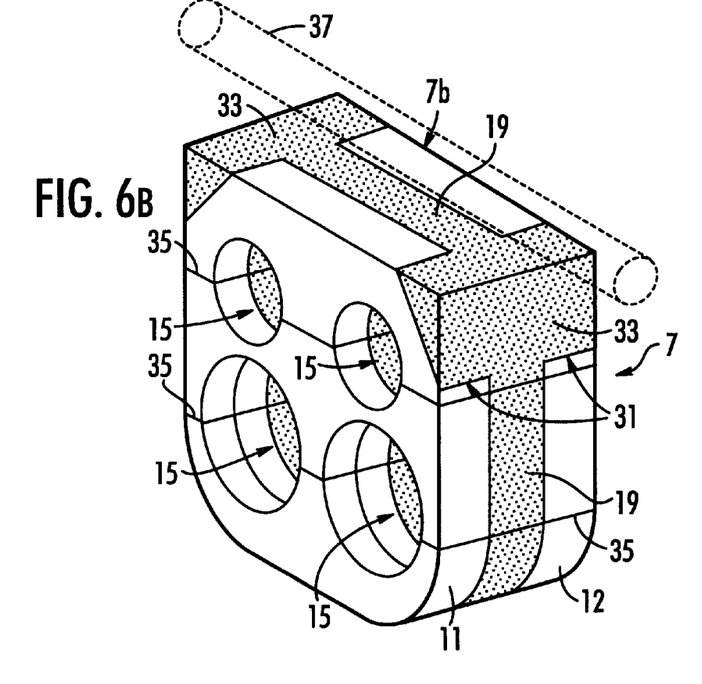

FIGS. 6A and 6B show two further cable seal inserts 7 according to the invention. These two inserts are substantially identical to each other except that the one illustrated in FIG. 6A has only one cable aperture 15 whereas the one illustrated in FIG. 6B has four cable apertures 15. Instead of having hinges to enable a cable to be inserted into them by "side-entry" (as in FIG. 4), these cable seal inserts each comprise two (FIG. 6A) or three (FIG. 6B) parts which are separable at 35, to permit such side-entry into the apertures. Also, the plates 11 and 12 of the cable seal inserts each have an opening 31 at each laterally extreme edge of their (upper) substantially planar peripheral surface 7b, into which opening some of the sealing material 33 (preferably gel) extends. As mentioned above, this has the advantage that a gasket or other seal extending, in use, across a plate of the cable seal insert will be in sealing contact with the sealing material at each laterally extreme edge of the cable seal insert. This is advantageous because the seal provided, in use, by the cable seal insert is generally most likely to fail (if at all) at these laterally extreme edges (sometimes termed "triple points" in the art). By providing the openings, thus allowing the sealing material to extend to the laterally extreme edges of the cable seal insert, the risk of such a failure of the seal is greatly reduced. Shown in dashed outline in each figure is a gasket or other seal 37 (e.g. an O-ring seal) extending across the plate 12 and in sealing contact with the gel 33 at each laterally extreme edge of the cable seal insert.

Figure 7A:
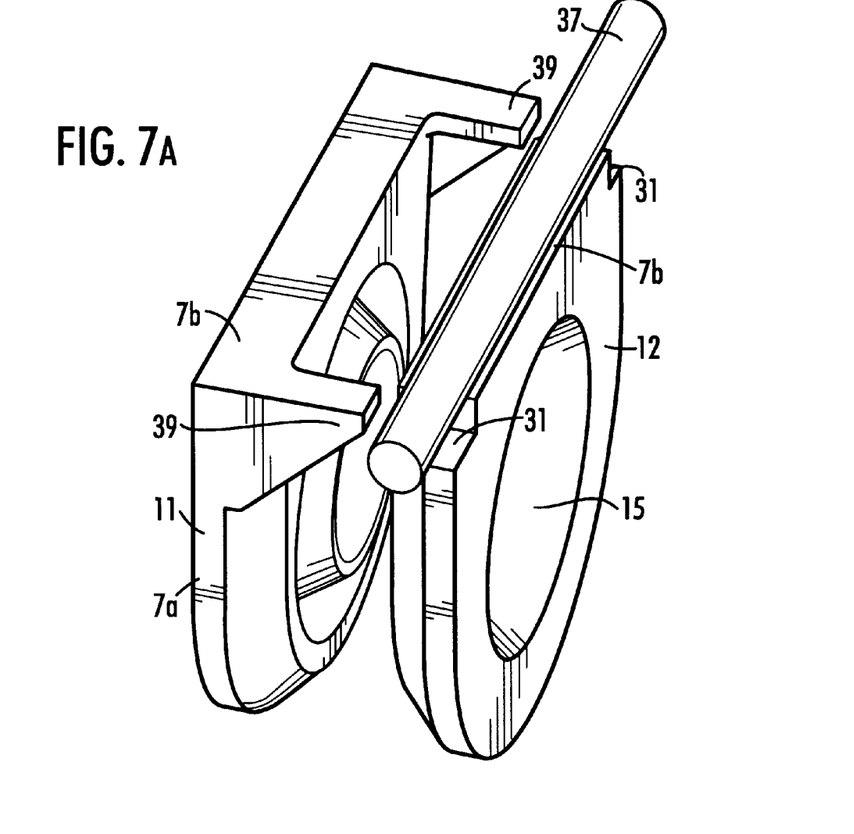
FIGS. 7A to 7C show the plates of another cable seal insert according to the invention, with the sealing material omitted, for clarity.
Figure 7B:
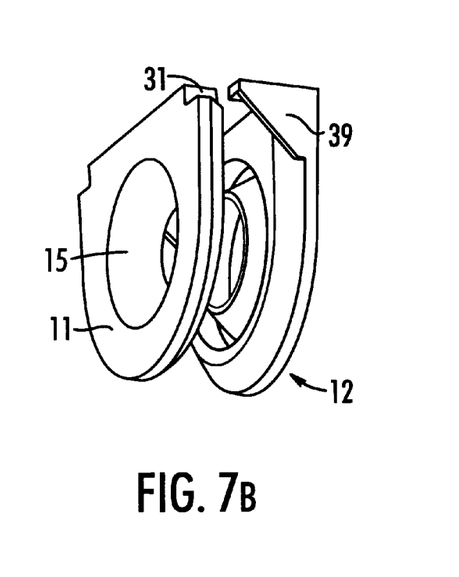
Figure 7C:
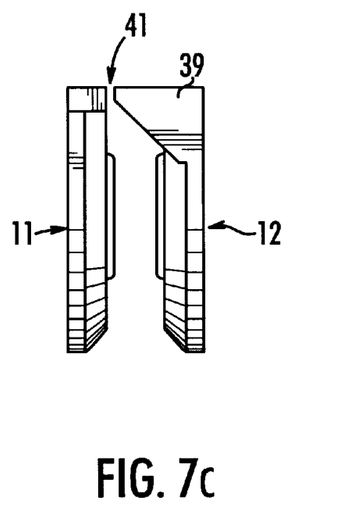

FIGS. 7A, 7B and 7C show another cable insert 7 according to the invention, with the sealing material omitted for the sake of clarity. In FIG. 7A a gasket or other seal 37 (e.g. an O-ring seal) is shown extending across the plate 12. At each laterally extreme edge of the upper substantially planar peripheral surface 7b of the plate 12 there is an opening 31 into which, in use, some of the sealing material extends. The other plate 11 has two barriers 39 for preventing the sealing material from escaping from between the plates 111 and 12 of the cable seal insert 7 in use. Each barrier 39 is situated at a corner of the plate 11 between the substantially planar surface 7b and the lateral part of the curved peripheral surface 7a. The barriers 39 each comprise an extension of the plate 11 towards the other plate 12. As best illustrated in FIG. 7C, there is preferably a gap 41 between the barriers 39 and the other plate 12, in which gap sealing material is situated in use.

Figure 8A:
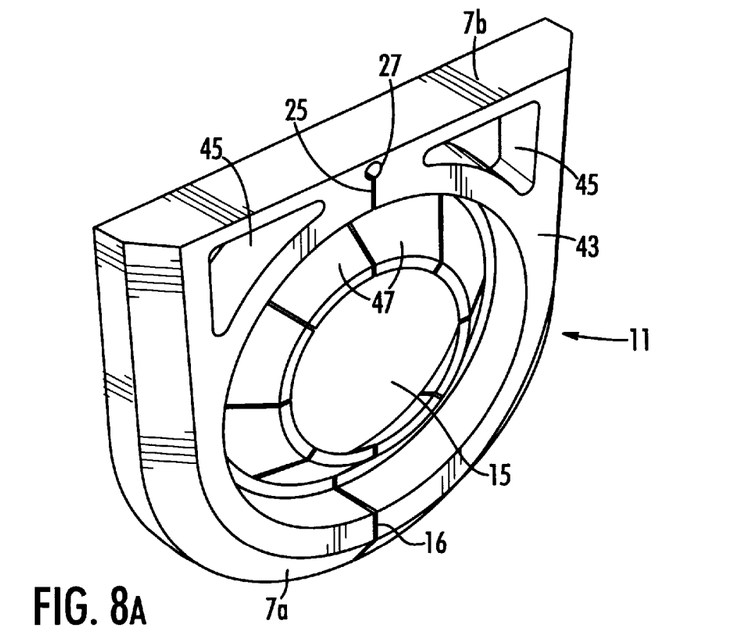
FIGS. 8A and 8B show two views of one of the plates of yet another cable seal insert according to the invention.
Figure 8B:
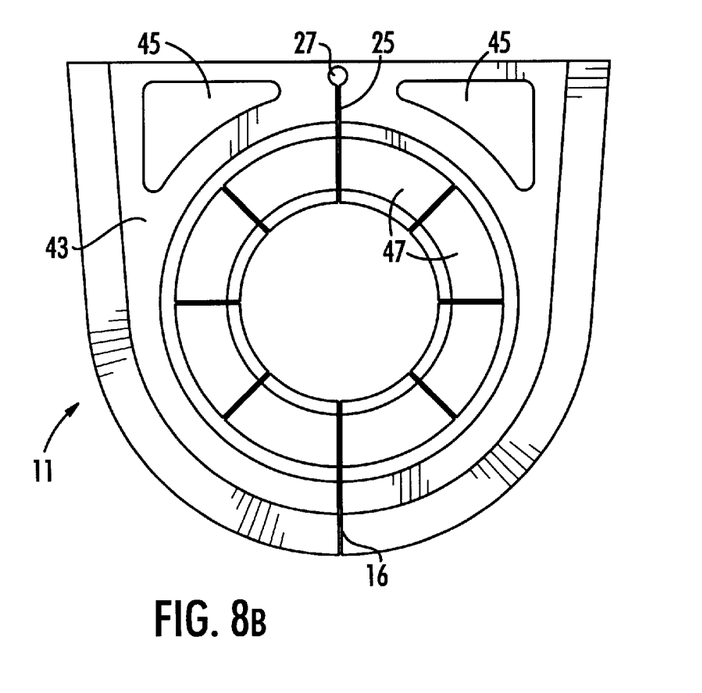

FIGS. 8A and 8B illustrate one plate 11 of yet another cable seal insert 7 according to the invention. The surface 43 of this plate, which is in contact with the sealing material 19 in use, has two recesses 45 in it, into which the sealing material may expand and/or be displaced in use (as described above). The recesses have the advantage that expansion of the sealing material, e.g. due to a rise in temperature, or displacement of the sealing material, e.g. due to a large diameter cable being inserted into the cable seal insert, may be accommodated substantially without loss (or at least without significant loss) of sealing material from between the plates. Such recesses may be used in combination with barriers, e.g. as illustrated in FIG. 7. As illustrated, the recesses 45 do not extend the whole way through the thickness of the plate, i.e. they are not open to the exterior of the cable seal insert. This has the advantage that air (or other gas or vapor) in the recesses may be pressurized if some of the sealing material is displaced or expanded into the recesses, thereby applying an opposing compression to the sealing material (the advantage of which was mentioned above). Alternatively, the or each recess may be open to the exterior of the cable seal insert, e.g. by means of one or more holes through the plate in the recess. This has the advantage of releasing any pressure build-up in the recess due to displacement or expansion of the sealant into the recess, thereby providing containment of such displacement or expansion.

The plate 11 shown in FIGS. 8A and 8B also includes a plurality of flaps 47 extending into the cable aperture 15 from the internal periphery of the aperture. The flaps 47, which can flex with respect to the plate 11, are provided around substantially the entire internal periphery of the cable aperture 15, and extend towards the opposite plate (not shown) as well as towards the centre of the cable aperture. The flaps 47 help to retain the sealing material between the plates, they enable the cable aperture to accommodate a significant range of sizes and cross-sectional shapes (e.g. oval cross-sections) of cable, and they may help to put the sealing material under compression by being resilient. The flaps may be referred to as "crowns" since they give the cable aperture 15 a crown-like appearance.

The cable seal insert plates 11, 12 illustrated in FIGS. 7 and 8 have bevelled perpipheral surfaces 7a. This has the advantage that the peripheral surfaces 7a of the plates are of reduced thickness, thus providing a corresponding increase in the thickness of sealing material which contacts the interior of the cable entry recess in the closure (and thereby substantially ensuring that the seal between the insert and the cable entry recess is as good as possible).

Figure 9:
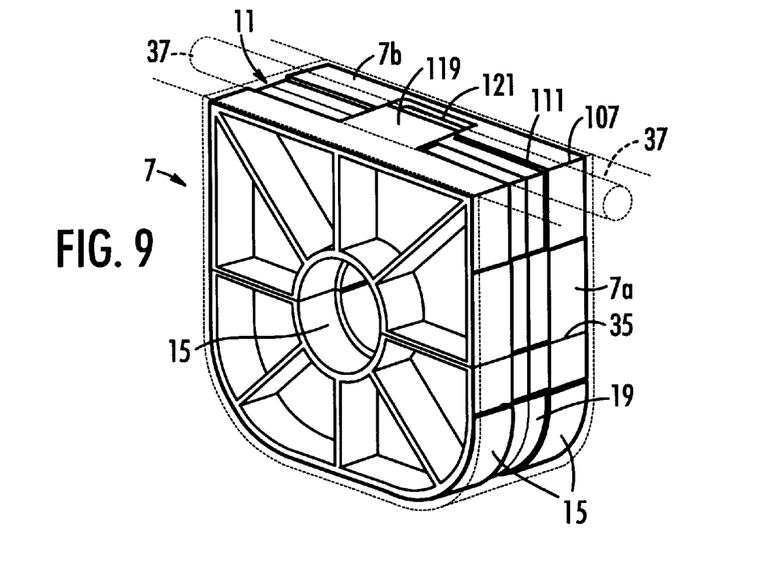
FIG. 9 shows a different type of cable seal insert according to the invention.

FIG. 9 shows another type of cable seal insert 7 according to the invention, which has a substantially planar first peripheral surface 7b and a substantially U-shaped second peripheral surface 7a extending from one end of the first peripheral surface around the periphery of the cable seal insert to the other end of the first peripheral surface. There is an edge 107 between the first and second peripheral surfaces at each end of the first peripheral surface. The second peripheral surface 7a partly comprises sealing material 19 (preferably gel), and there is an opening 111 at each edge 107 between the first and second peripheral surfaces (i.e. where the first and second surfaces meet), through which the sealing material of the second peripheral surface extends to the first peripheral surface. Shown in dotted outline is part of a gasket sealing member 37 (preferably an O-ring seal) which, in use, extends across the first peripheral surface of the seal insert 7. It can be seen that the sealing member 37 is in contact with the sealing material 19 where the first and second peripheral surfaces of the cable seal insert meet each other. In use, the seal insert 7 is received in a cable entry aperture in a casing of a cable splice closure, shown in dotted outline. Thus, the sealing material 19 at the edge between the first and second peripheral surfaces of the cable seal insert forms a seal at the so-called "triple point" where the seal insert 7, the sealing member 37 and the casing all meet each other.

The seal insert 7 shown in FIG. 9 comprises a pair of plates 11, 12 between which is the sealing material 19. Apart from where a cable port 15 extends through the seal insert, the sealing material 19 extends over substantially the entire cross-section of the plates. On the first peripheral surface 7b of the seal insert 7, between the openings 111, there is a support 119 which, in use, supports the gasket sealing member 37 and thereby substantially ensures that, in use, it forms a seal against the cover of a casing where it extends across the seal insert. The support 119 comprises a substantially flat part of one plate which extends across the sealing material 19 on the first peripheral surface 7b and protrudes into a slot 121 in the other plate. This allows the plates to be moved relatively closer together, thereby applying compression to the sealing material and consequently causing some of it to be displaced laterally outwards into sealing contact with the casing in the cable entry aperture and causing some of it to be displaced laterally inwards into sealing contact with a cable extending through the cable aperture 15. The seal insert 7 is furthermore split at 35 into two half-pieces, to permit side-entry of a cable into the cable port 15.

Figure 10A:
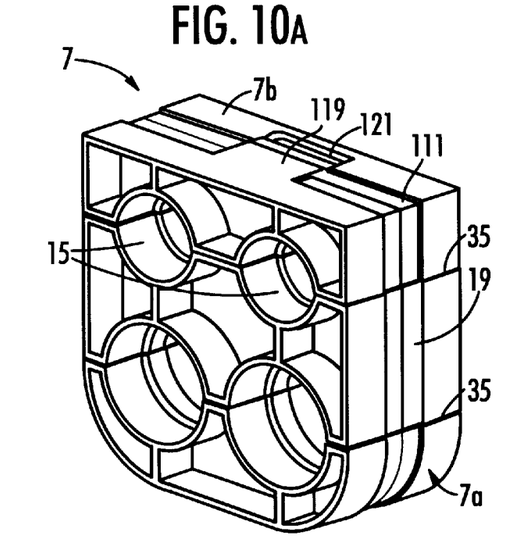
FIGS. 10(a)–(b) show another cable seal insert similar to that of FIG. 9.
Figure 10B:
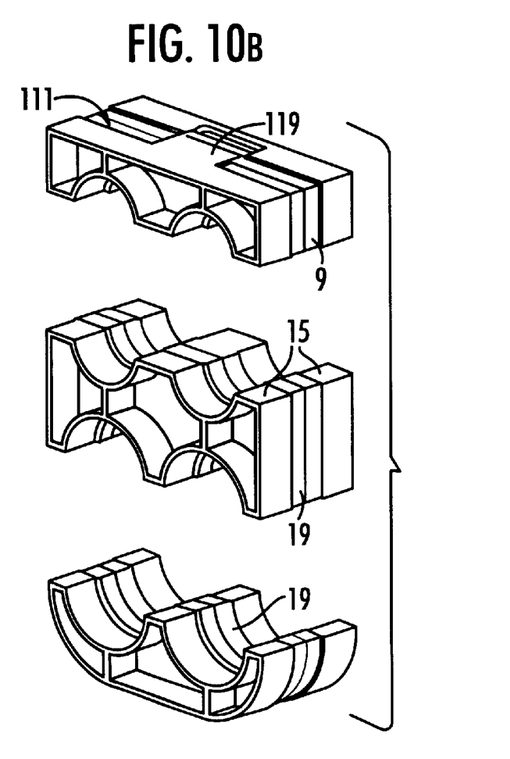

FIG. 10(a and b) shows a seal insert 7 which is substantially identical to that shown in FIG. 9 except that it has four cable apertures 15 and is split into three separate parts to permit side-entry of cables into the ports.

Figure 11A:
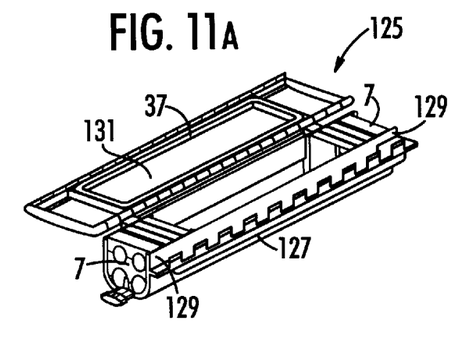
FIGS. 11(a)–(c) show one type of cable splice closure according to the invention.
Figure 11B:
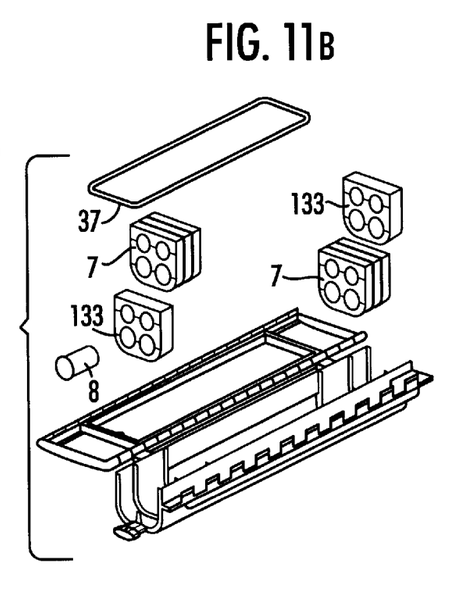
Figure 11C:
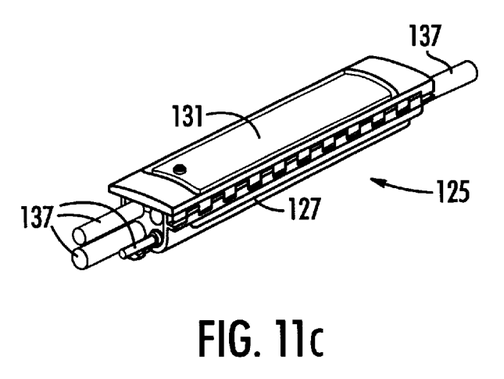

FIG. 11(a to c) shows a cable splice closure 125 according to the invention, comprising a casing which comprises a base 127 which has two casing end portions 129, and a cover 131. The closure 125 further comprises a sealing member 37 in the form of an O-ring seal and a pair of seal inserts 7 as shown in FIG. 10. The closure also has strain-relief members 133 to grip the cables, and plugs 8 to block-off any unused cable apertures 15 in the seal inserts. In use, the O-ring sealing member 37 seals between the base 127 and the cover 131 and extends across the seal inserts 7 which are slotted into the casing end portions 129. In FIG. 11b, the closure is fully dis-assembled, in FIG. 11a it is partially assembled, and in FIG. 11c it is fully assembled and closed around a splice between cables 137.

Figure 12A:
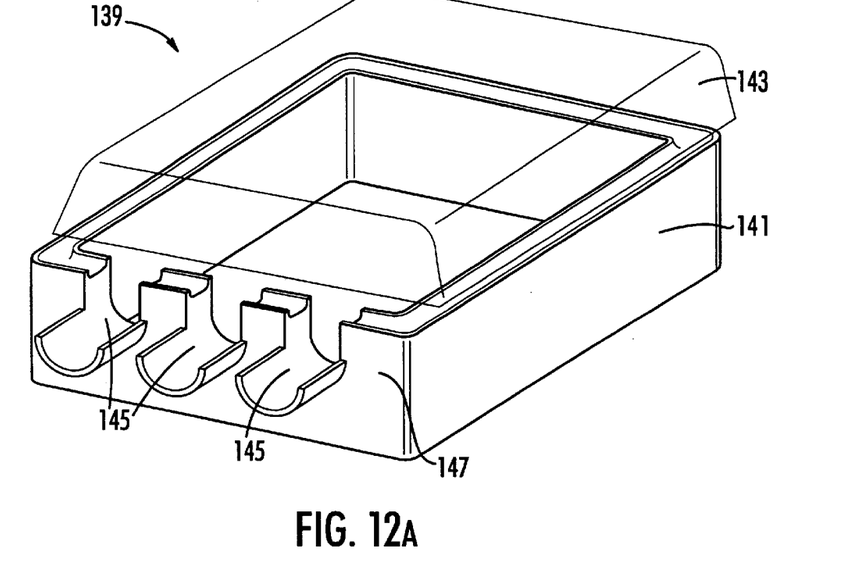
FIGS. 12(a)–(b) show shows another type of cable splice closure according to the invention.
Figure 12B:
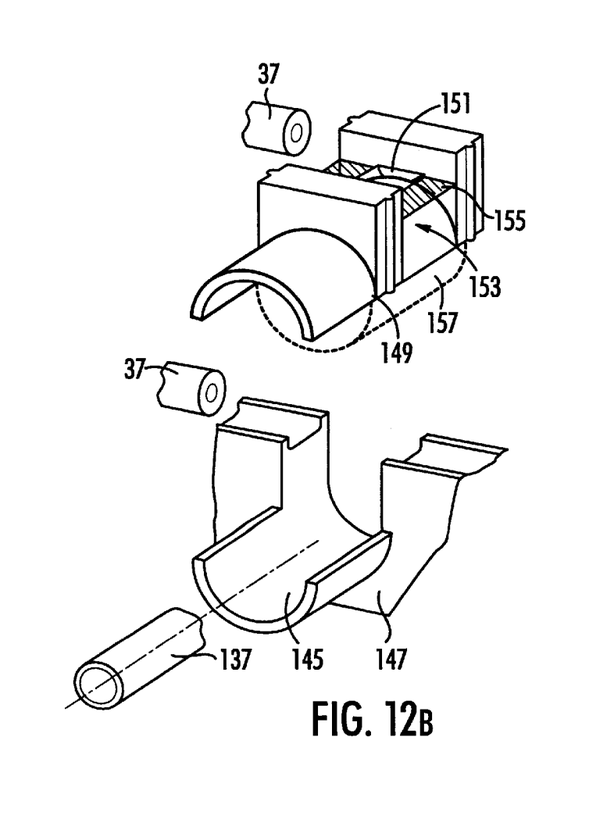

FIG. 12a shows another form of cable splice closure 139 according to the invention. This closure 139 comprises a casing having a base 141 and a cover 143, with cable entry apertures 145 in a casing end portion 147 of the base. FIG. 12b shows a detail of one of the cable entry apertures 145 of the closure 139. In this closure, the support (for supporting an O-ring sealing member 37) which, in use, is on the first peripheral surface of the seal insert comprises a part 149 which slots into the casing end portion 147. This part 149 has a portion 151 which, in use, lies between the first peripheral surface of a seal insert inserted into the cable entry aperture 145 and the sealing member 37. In this embodiment, therefore, instead of the or each support for the sealing member 37 being an integral part of the seal insert, it is a separate part which is placed on the first peripheral surface of the seal insert. Thus the openings (indicated generally at 153) where the first peripheral surface 155 meets the second peripheral surface 157 of the seal insert (indicated in dotted outline) are provided by the portion 151 of the separate part 149. Thus, in this embodiment, the or each seal insert may be without distinct openings where the first and second peripheral surfaces meet, until its installation in the closure.

What is claimed is:

1. A cable seal insert for sealing a cable entry in a closure, comprising:

(a) at least two plates, each plate having a flat upper peripheral surface and a U-shaped lower peripheral surface connected thereto, at least one cable aperture extending therethrough for a cable, and a slit extending from the at least one cable aperture to the lower peripheral surface; and (b) sealing gel located between the at least two plates; wherein a surface of at least one of the at least two plates is in contact with the sealing gel, the surface having at least one recess therein into which some of the sealing gel extends, and the flat upper peripheral surface is positioned above and spaced apart from the at least one cable aperture and is substantially parallel thereto.

2. A cable seal insert according to claim 1, wherein the U-shaped lower peripheral surface is substantially parallel to the at least one cable aperture.

3. A cable seal insert according to claim 1, wherein the slit is positioned to allow lateral insertion of the cable.

4. A cable seal insert according to claim 1, further comprising one or more barriers for substantially preventing displacement of the sealing gel from part of the upper and lower peripheral surfaces.

5. A cable seal insert according to claim 4, wherein each barrier is situated at a corner of an interface defined by the flat upper peripheral surface and the U-shaped lower peripheral surface.

6. A cable seal insert according to claim 1, wherein each plate includes a plurality of flaps extending into each cable aperture from an internal periphery of each respective cable aperture.

7. A cable seal insert according to claim 1, wherein the sealing gel has one or more of: a cone penetration of from 100–350 ($10^{-1}$ mm); and an ultimate elongation of at least 200%; and a Stevens Voland hardness from 60 to 130 g.

8. A cable seal insert according to claim 1, wherein at least one of the at least two plates has a Shore A hardness of greater than 90.

9. A cable seal insert for sealing a cable entry in a closure, comprising:

(a) at least two plates, each plate having a flat upper peripheral surface and a U-shaped lower peripheral surface connected thereto, at least one cable aperture extending therethrough for a cable, and a slit extending from the at least one cable aperture to the lower peripheral surface; and (b) sealing gel located between the at least two plates;

wherein the flat upper peripheral surface is positioned above and spaced apart from the at least one cable aperture and is substantially parallel thereto, and at least one of the at least two plates comprises non-elastomeric material.

10. A cable seal insert according to claim 1, wherein each plate is formed from non-elastomeric material.

11. A cable seal insert according to claim 9, wherein at least one of the at least two plates includes an opening at each laterally extreme edge of the flat upper peripheral surface thereof into which some of the sealing gel extends.

12. A cable seal insert for sealing a cable entry in a closure, comprising:

(a) at least two plates, each plate having a flat upper peripheral surface and a U-shaped lower peripheral surface connected thereto, at least one cable aperture extending therethrough for a cable, and a slit extending from the at least one cable aperture to the lower peripheral surface; and (b) sealing gel located between the at least two plates;

wherein the flat upper peripheral surface is positioned above and spaced apart from the at least one cable aperture and is substantially parallel thereto, and at least one of the at least two plates includes an opening at each laterally extreme edge of the flat upper peripheral surface thereof into which some of the sealing gel extends.

13. A cable splice closure comprising a casing which comprises a casing end portion and a cover, the casing end portion having a cable entry aperture being closed by the cover, a gasket sealing member which seals between the casing end portion and the cover, and a cable seal insert which is received in the cable entry aperture, and comprises a first plate having a first surface across which extends the gasket sealing member, and a second plate having a second surface which seals against the casing end portion in the cable entry aperture, and sealing gel located between the first and second plates, each plate comprising a flat upper peripheral surface and a U-shaped lower peripheral surface connected thereto, the flat upper peripheral surface being positioned above and spaced apart from the at least one cable aperture extending therethrough for a cable and is substantially parallel thereto, and a slit extending from the at least one cable aperture to the lower peripheral surface; and the flat upper peripheral surface of the first plate having at least one opening through which some of the sealing gel extends.

14. A closure according to claim 13 wherein the at least one opening in the first plate is at each end of the flat upper peripheral surface.

15. A closure according to claim 14, wherein there is at least one support on the flat upper peripheral surface of the first plate adjacent the at least one opening which supports the gasket sealing member to form a seal against the cover where it extends across the cable seal insert.

16. A closure according to claim 15, wherein the at least one support extends between the first and second plates.

17. A closure according to claim 15, wherein the at least one support overlaps the second plate.

18. A closure according to claim 15, wherein the at least one support permits the first and second plates to be moved towards each other.

19. A closure according to claim 15, wherein the at least one support is separable from the first plate.

20. A closure according to claim 19, wherein the at least one support forms part of the casing end portion which lies between the cable seal insert and the sealing member.

21. A closure according to claim 20, wherein the at least one support is received by the casing end portion.

22. A cable splice closure comprising:

a substantially rigid casing comprising a base and cover sealed together by a gasket sealing member, the base and cover having at least one cable entry recess, and wherein each recess is sealed by a cable seal insert received therein and abutting against the gasket sealing member between the base and the cover, wherein the cable seal insert comprises (a) at least two plates, each plate having a flat upper peripheral surface and a U-shaped lower peripheral surface connected thereto, at least one cable aperture extending therethrough for a cable, and a slit extending from the at least one cable aperture to the lower peripheral surface; and (b) sealing gel located between the at least two plates;

wherein the flat upper peripheral surface is positioned above and spaced apart from the at least one cable aperture and is substantially parallel thereto, and at least one of the at least two plates comprises non-elastomeric material.

23. A cable seal insert for a cable entry aperture in an end portion of a cable splice closure casing, having a first plate to seal against a gasket sealing member of the casing, and a second plate with sealing material between the first and second plates extending around a periphery of the cable seal insert to seal against the end portion of the casing, and wherein the cable seal insert has an opening where the first and second plates meet through which the sealing material extends to the first plate, each plate comprising a flat upper peripheral surface and a U-shaped lower peripheral surface connected thereto, at least one cable aperture extending therethrough for a cable, and a slit extending from the at least one cable aperture to the lower peripheral surface, and the flat upper peripheral surface being positioned above and spaced apart from the at least one cable aperture and is substantially parallel thereto.

24. A cable seal insert according to claim 23, wherein the sealing material comprises gel, elastomer, polymeric foam or mastic.

* * * * *